US012689662B1

(12) United States Patent
Lad

(10) Patent No.: US 12,689,662 B1
(45) Date of Patent: Jul. 21, 2026

(54) GENERATING MACHINE DATA COLLECTION SCRIPTS FROM SECURITY POLICY CONTENT

(71) Applicant: Rapid7, Inc., Boston, MA (US)

(72) Inventor: Mitesh Lad, Calgary (CA)

(73) Assignee: Rapid7, Inc., Boston, MA (US)

( * ) Notice: Subject to any disclaimer, the term of this patent is extended or adjusted under 35 U.S.C. 154(b) by 150 days.

(21) Appl. No.: 18/809,577

(22) Filed: Aug. 20, 2024

(51) Int. Cl.
  *H04L 9/40* (2022.01)
(52) U.S. Cl.
  CPC .................................... *H04L 63/20* (2013.01)
(58) Field of Classification Search
  CPC ...................................................... H04L 63/20
  See application file for complete search history.

(56) References Cited

U.S. PATENT DOCUMENTS

| | | | |
|---|---|---|---|
| 8,074,277 B2 | 12/2011 | Freund | |
| 8,490,163 B1 | 7/2013 | Harsell et al. | |
| 8,973,092 B2 | 3/2015 | Kanoun et al. | |
| 11,816,214 B2 | 11/2023 | Kutt et al. | |
| 2004/0260818 A1* | 12/2004 | Valois | H04L 63/101 |
| | | | 709/229 |
| 2007/0136603 A1* | 6/2007 | Kuecuekyan | H04L 63/0884 |
| | | | 713/185 |
| 2007/0226259 A1* | 9/2007 | Kacin | G06F 9/45512 |

| | | | |
|---|---|---|---|
| 2008/0225748 A1* | 9/2008 | Khemani | H04L 47/10 |
| | | | 370/254 |
| 2022/0050897 A1* | 2/2022 | Gaddam | G06N 3/006 |
| 2022/0086189 A1* | 3/2022 | Nguyen | H04L 63/20 |
| 2023/0117962 A1* | 4/2023 | Kaimal | H04L 41/082 |
| | | | 726/1 |
| 2023/0315848 A1 | 10/2023 | Strogov et al. | |
| 2023/0367911 A1* | 11/2023 | Balber | G06N 20/20 |
| 2025/0184366 A1* | 6/2025 | Keiser, Jr. | H04L 63/20 |
| 2025/0238211 A1* | 7/2025 | Kanjiram | G06F 8/427 |

* cited by examiner

*Primary Examiner* — Stephen T Gundry
(74) *Attorney, Agent, or Firm* — Ashwin Anand

(57) ABSTRACT

A script generation service is disclosed that parses a security policy to identify data objects controlled by the policy and generate data collection commands in a shell scripting language to collect states of the data objects from machines. In embodiments, the security policy is written in a policy specification language that allows data objects to be specified using references to object entities, variables, other objects, transformation functions, and/or state filters. The generation service is capable of resolving these types of references either during the script generation process or using commands in the generated script. In embodiments, the generated scripts are pushed to data collection agents executing on machines in a monitored network, which can execute the scripts as authenticated processes to collect and return machine state data about the machines. The machine state data is then assessed to identify possible security policy violations.

20 Claims, 9 Drawing Sheets security policy specification
200

```
<registry_test xmlns="http://xyz.org/schema"
    comment="Ensure RelaxMinimumPasswordLengthLimits is 1"
    id="org.xyz:tst:333444">
        <object object_ref="org.xyz:obj:333444"/>
        <state state_ref="org.xyz:ste:333444"/>
</registry_test>
``` compliance test
210

```
<registry_object xmlns="http://xyz.org/schema"
    id="org.xyz:obj:333444">
        <hive>HKEY_LOCAL_MACHINE</hive>
        <key operation="equals">System\Control\SAM</key>
        <name operation="equals">
            RelaxMinimumPasswordLengthLimits</name>
</registry_object>
``` data object
220 object entities
222 data collection command(s)
152

```
<registry_state xmlns="http://xyz.org/schema"
    id="org.xyz:ste:333444">
        <type>reg_dword</type>
        <value operation="equals">1</value>
</registry_state>
``` compliant object state
230 assessment queries(s)
162

*security policy specification*
*200*

```
<registry_object id="org.xyz:tst:333888">          object with
                                                   variable reference
    <hive>HKEY_USERS</hive>                              240

<key operation="equals"
        var_ref="org.xyz:var:444555"      variable reference    ◄──── resolve
                                                242                      244
        var_check="at least one"/>

<name operation="equals">ScreenSaveActive</name>

</registry_object>
```

```
<variable datatype="string" id="org.xyz:var:444555">

<concat>                                              transformation
                                                            function
        <component field="key"                                252
            object_ref="org.xyz:obj:222999"/>

<component>\Software\Policies\Desktop</component>

</concat>

</variable>
                                         variable with object reference
                    resolve 254                        250
```

```
<registry_object id="org.xyz:obj:222999"          referenced object
                                                          260
    comment="HKEY_USERS Local Account Keys">

<hive>HKEY_USERS</hive>

<key operation="pattern match">
        ^S-1-5-21-[0-9]+-[0-9]+-[0-9]+-[0-9]{3,}$</key>

<name xsi:nil="true" operation="equals"/>

</registry_object>
```

*FIG. 2B*

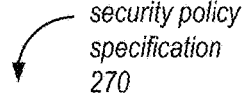

security policy
specification
270

```
<file_object id="org.xyz:obj:887788">

<path operation="pattern match">.*</path>

<filename operation="pattern match">.*</filename>

<filter action="include">                    filter
          org.xyz:ste:887799                        282
      </filter>

</registry_object>
``` object with
filter reference
280 collection time resolve
284

```
<file_state id="org.xyz:ste:887799">

<user_id operation="equals" datatype="int">755</user_id>

</file_state>
``` filter state
290

*FIG. 2C*

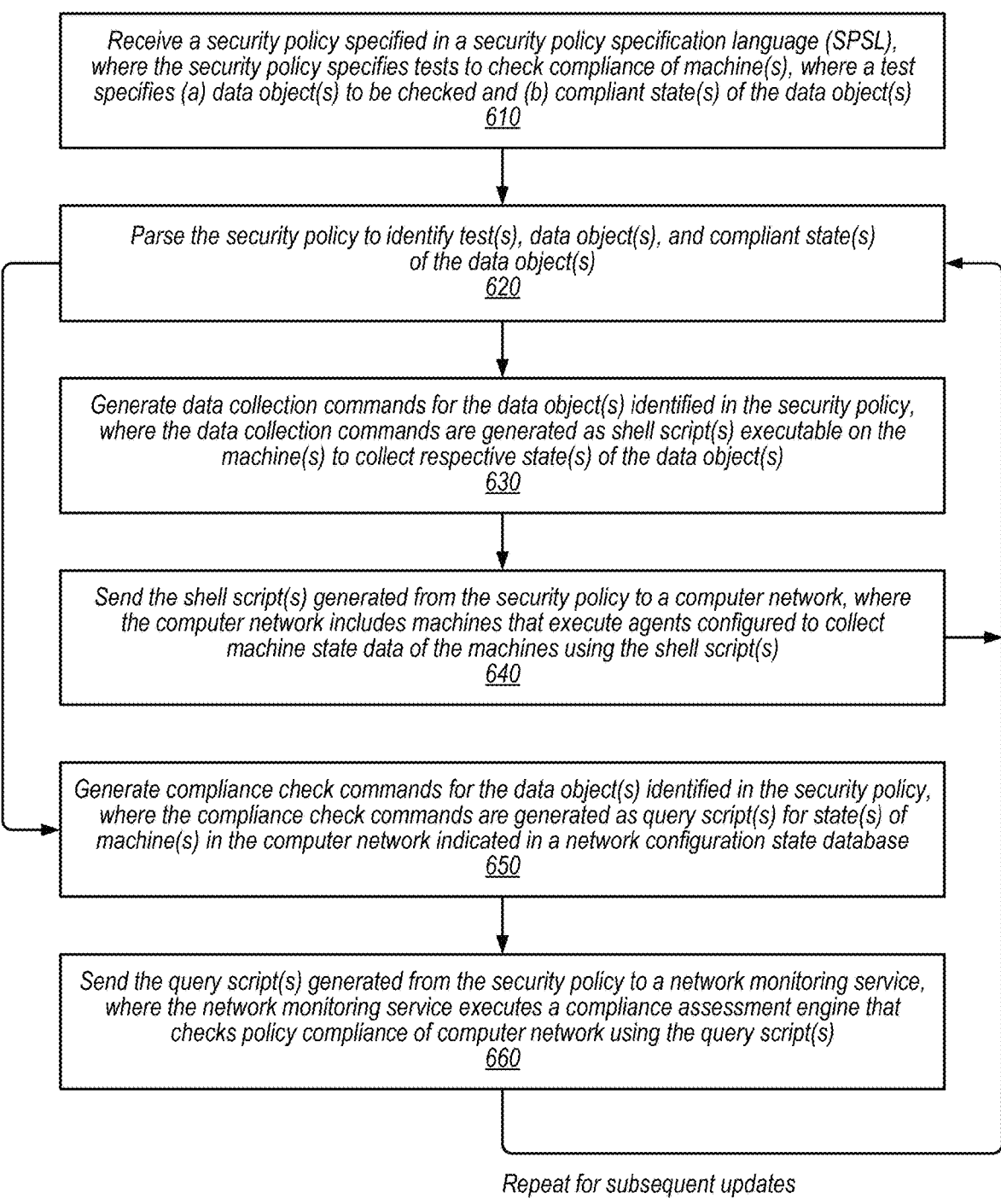

Receive a security policy specified in a security policy specification language (SPSL), where the security policy specifies tests to check compliance of machine(s), where a test specifies (a) data object(s) to be checked and (b) compliant state(s) of the data object(s)
610

Parse the security policy to identify test(s), data object(s), and compliant state(s) of the data object(s)
620

Generate data collection commands for the data object(s) identified in the security policy, where the data collection commands are generated as shell script(s) executable on the machine(s) to collect respective state(s) of the data object(s)
630

Send the shell script(s) generated from the security policy to a computer network, where the computer network includes machines that execute agents configured to collect machine state data of the machines using the shell script(s)
640

Generate compliance check commands for the data object(s) identified in the security policy, where the compliance check commands are generated as query script(s) for state(s) of machine(s) in the computer network indicated in a network configuration state database
650

Send the query script(s) generated from the security policy to a network monitoring service, where the network monitoring service executes a compliance assessment engine that checks policy compliance of computer network using the query script(s)
660

Repeat for subsequent updates of the security policy

FIG. 6

GENERATING MACHINE DATA COLLECTION SCRIPTS FROM SECURITY POLICY CONTENT

BACKGROUND

Security information and event management (SIEM) systems are cybersecurity solutions designed to monitor events generated by a computer network and perform assessments of the event data for security incidents, risks, and/or vulnerabilities. Conventionally, SIEM systems are not used for monitoring compliance with security policies, and in particular, existing data collection processes used by these systems are not geared towards compliance monitoring use cases. There is a current trend in various industries towards automation of security policy compliance monitoring. However, existing security monitoring systems are not well suited to provide this functionality because they are not readily programmable to implement different types of security policies and keep up with regular changes in these policies.

BRIEF DESCRIPTION OF THE DRAWINGS

FIGS. 2A to 2C illustrate an example security policy specified in a security policy specification language (SPSL) that is used to generate data collection scripts, according to some embodiments.

FIG. 6 is a flowchart illustrating a process of generating and uploading scripts to implement security policy compliance assessment of computer network(s), according to some embodiments.

Figure 1:
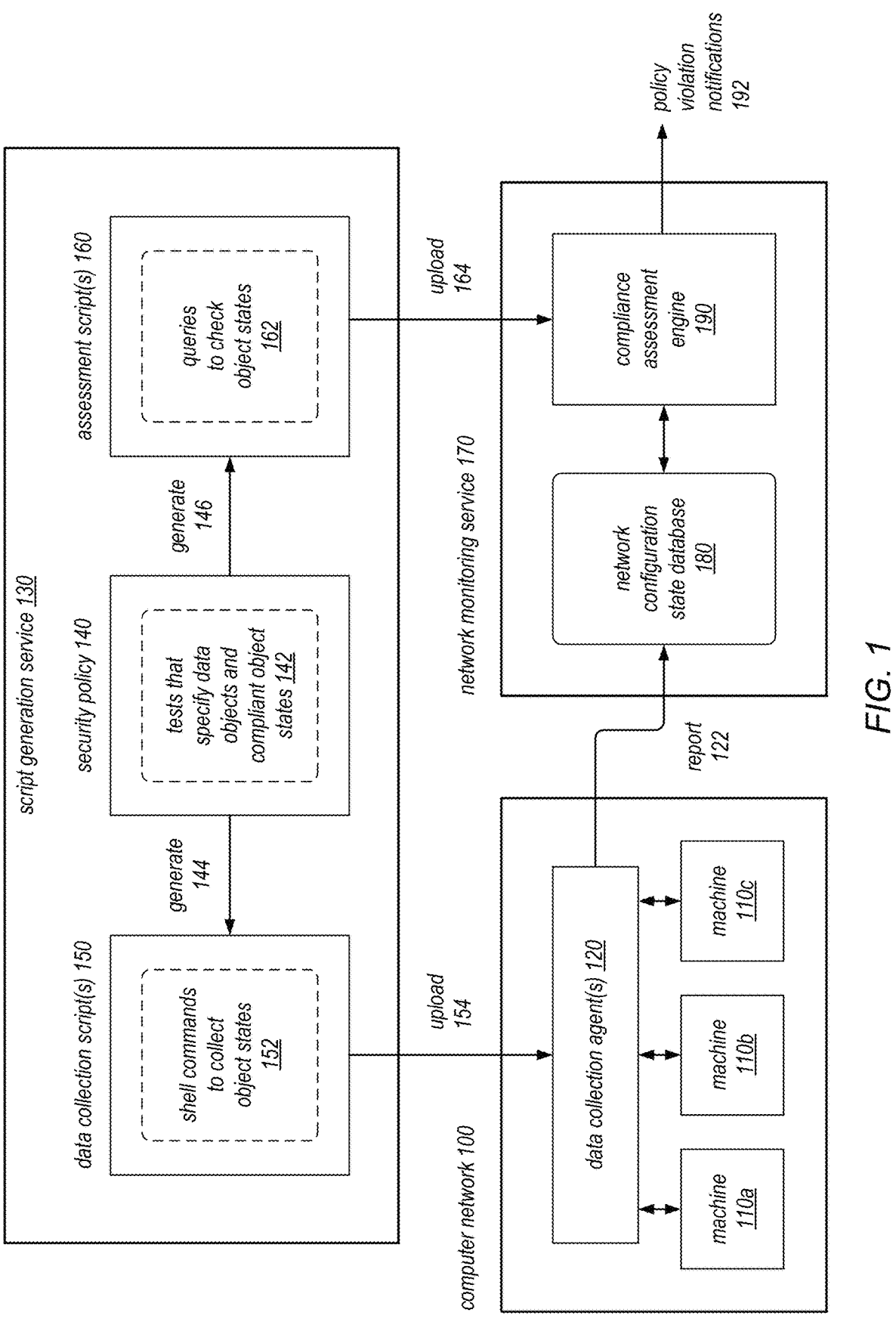
FIG. 1 is a block diagram illustrating a network monitoring service and a script generation service that implement a security compliance assessment process by generating data collection scripts from a security policy, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In recent years, cybersecurity solution companies such as SIEM software vendors and managed detection and response (MDR) service providers have begun experimenting with automated monitoring of computer networks for security policy compliance. The security policies adopted by companies are often security benchmarks promulgated by standards-setting organizations such as Center for Internet Security (CIS), Defense Information Systems Agency (DISA), and the like, which can change over time. There is currently an open standards library called Security Content Automation Protocol (SCAP) that provides various standards for security management processes. Among these is a component called Open Vulnerability and Assessment Language (OVAL), which is a specification language that can be used to define security benchmarks for computer networks. OVAL is used by a number of security organizations to formally promulgate their security policy content.

In order to implement security policy compliance monitoring, network monitoring software must be programmed to collect specific types of network configuration data indicated in the security policy, which can include a huge number of discrete data items. For example, a typical benchmark for a WINDOWS machine can include compliance requirements for thousands of WINDOWS registry keys. Once these data items are collected, they must then be individually evaluated against the rules indicated in the security policy using the existing assessment capabilities of the network monitoring software. It is a hugely difficult and time-consuming task to program and/or configure the network monitoring software to perform all of the checks specified in a typical security benchmark.

Moreover, promulgated security benchmarks can change over time as newer versions of the benchmarks are released. Some companies may also choose to customize a security benchmark based on their own requirements. Whenever the security policy is changed, the network monitoring software must be updated to implement new compliance checks specified by the change, so that any lapses in compliance checking are kept to a minimum. Keeping up with constant changes of security policies can involve significant reprogramming and/or reconfiguration of the network monitoring software, which can be expensive, time-consuming, and error-prone.

To address these problems in the state of the art, this application describes embodiments of a network monitoring software that can automatically generate data collection and compliance assessment scripts according to a security benchmark specified in a security policy specification language (SPSL). In at least one embodiment, the SPSL is OVAL, which defines a standard XML schema for specifying security policy content.

In some embodiments, the network monitoring software may be implemented as part of a network monitoring service that continuously monitors many client networks for policy violations. The network monitoring service may collect network configuration data using data collection agents deployed in the monitored network. One benefit of using data collection agents over external scan engines is that the agents can typically execute as trusted processes inside the monitored network without having to be authenticated for data collection tasks, allowing these agents to directly execute data collection commands on assets within the network.

In some embodiments, the network monitoring service implements a script generation service that parses a security benchmark or policy according to the SPSL to generate data collection commands for the data collection agents. The script generation service may parse the security policy to identify a set of data objects that are to be collected for compliance assessment, and then generate data collection commands executable on a machine to collect states of the data objects. In some embodiments, the data collection commands are generated as shell scripts (e.g. POWER-SHELL script for WINDOWS machines). In some embodiments, the generated commands or scripts are pushed to the data collection agents in the computer network, executed by the agents to collect the relevant object states of the assets, and then returned by the agents to the network monitoring service for assessment. In some embodiments, the script generation service may also generate assessment scripts used by the network monitoring service to assess the collected data.

In some embodiments, the SPSL includes language elements such as object entities (or attributes), nested objects, variables, transformation functions, state filters, and others. In some embodiments, the script generation service is able parse security policies according to the SPSL to recursively identify and resolve instances of these language elements, so that the generated data collection command(s) indicates the fully resolved platform name for a data object.

In some embodiments, the script generation service may be run automatically whenever the security policy changes. In some embodiments, the script generation services may determine a subset of data objects or compliance rules in the security policy that have changed since the last version of the policy and regenerate a subset of the data collection commands and/or scripts that are impacted by the changes. In some embodiments, newly generated commands and/or scripts are automatically pushed to the data collection agents. The push may be performed according to a schedule so that the newly pushed data collection scripts will be used for a next scheduled collection.

As will be appreciated by those skilled in the art, the disclosed techniques improve the functioning of computer systems that implement network monitoring services, to automatically generate data collection scripts and assessment scripts used for automated security policy compliance monitoring. The data collection scripts may be generated automatically whenever a change to the security policy is detected. Moreover, the generated scripts are executable on machines with different operating systems (e.g. on WINDOWS, MACOS, LINUX) to collect data from these different machines. As such, the disclosed features represent a practical application of computer technology to achieve real-world benefits in real-world computer systems, and are not intended to capture any bare mental processes, pure mathematical concepts or formulae, methods of organizing human activity, fundamental economic practices, or other types of abstract subject matter not eligible for patenting. These and other features and benefits of the network monitoring service are described in further detail below in connection with the figures.

FIG. 1 is a block diagram illustrating a network monitoring service 170 and a script generation service 130 that implement a security compliance assessment process by generating data collection scripts 150 from a security policy 140, according to some embodiments.

As shown, FIG. 1 depicts a computer network 100 that is being monitored by the network monitoring service 170. In some embodiments, the network monitoring service 170 may be operated by a third-party service provider company that is contracted to monitor the computer network 100 for security vulnerabilities, compliance violations, configuration errors, anomalies, or signs of cyberattacks. In some embodiments, the monitoring service provider may operate a managed detection and response (MDR) service, where human analysts located at a security operations center (SOC) are continuously monitoring client networks for security policy violations. The network monitoring service 170 may employ a security information and event management (SIEM) system that is configured to harvest security-related data from client networks and perform different types of security assessments of the client networks according to configured security policies 140. In some embodiments, the script generation service 130 is implemented as part of the network monitoring service 170.

Depending on the embodiment, the computer network 100 may be a network of physical assets or a virtual network of virtual resources provisioned in a cloud service provider environment such as AMAZON WEB SERVICES (AWS), MICROSOFT AZURE, GOOGLE CLOUD, and the like. The machines 110a-c may include physical computing devices or virtual compute nodes running in the computer network 100. The assets may include virtual machine instances, containers and container orchestration resources, physical (e.g. bare metal servers), networking devices (e.g. virtual routers or firewall devices), data storage resources, among others.

As shown, in some embodiments, the network monitoring service 170 may interface with a set of data collection agents 120 deployed in the computer network 100. The data collection agents 120 may execute as authenticated processes in the network 100 to collect resource configuration data in the computer network 100 and/or event data. The collected information is reported 122 to the network monitoring service 170. The collected configuration data may include different types of security-related data monitored by the network monitoring service 170, such as asset configuration settings, resource permissions, user permissions, resource operating states and metrics, resource lifecycle events (e.g. resource creation and termination), etc. Depending on the embodiment, the collections may occur periodically according to a specified schedule, or triggered by certain events in the network 100. The collected data may be reported 122 to the network monitoring service over a wide area network (WAN) such as the Internet, and may be encrypted or otherwise protected using a secure communication protocol such as a Transport Layer Security (TLS)-based protocol. In some embodiments, collected data may not be transmitted over a WAN or a public network such as the Internet.

As shown, in some embodiments, the network monitoring service 170 may store the collected data in a network configuration state database 180, which may be used to store a history of successive states of the computer network 100. In some embodiments, the network monitoring service 170 is configured to perform periodic compliance assessments of the computer network 100 using a compliance assessment engine 190, based on the data in the network configuration state database 180. The assessment engine 190 may run queries against the database 180 to evaluate the network configuration state data for security policy violations. Any policy violations or other security issues discovered by the assessments are reported as notifications 192 to a live user interface or logged for triage. In response to a notification 192, a security analyst may be assigned to investigate the security policy violation as necessary or take action to remediate security problems detected in the computer network 100.

As shown, in some embodiments, the script generation service 130 provides data to both the data collection agents 120 and the compliance assessment engine 190 to facilitate the ongoing policy compliance monitoring process. In some embodiment, the script generation service 130 generates 144 data collection scripts 150 for the agents 120 and uploads 154 the data collection scripts to the computer network 100 to be distributed to the agents. In some embodiments, the script generation service 130 generates 146 assessment scripts 160 for the compliance assessment engine 190 and uploads 164 the assessment scripts to the network monitoring service 170 to be consumed by the compliance assessment engine.

As shown, in some embodiments, both the data collection scripts 150 and the assessment scripts 160 are generated programmatically by parsing the security policy 140. As discussed, security policy 140 may be a security benchmark promulgated by a standards-setting organization. In other embodiments, the security policy 140 may be a private security policy that is specific to a particular company or a customized version of a public security policy. In some embodiments, the security policy 140 is written in a security policy specification language (SPSL), which defines a syntax for specifying data objects to be checked for compliance with the policy and compliant or non-compliant states of the data objects. In at least one embodiment, the security policy is specified in the Open Vulnerability and Assessment Language (OVAL). In some embodiments, such as with OVAL, the security policy 140 will specify a number of compliance tests 142 for checking compliance of different types of assets in the computer network (WINDOWS machines, LINUX machines, etc.). Each test 142 may specify one or more data objects (e.g. registry entries, files, etc.) to be checked and respective compliant states of the objects.

In some embodiments, the script generation service 130 may be run on an ad hoc basis, for example, whenever a new version of the security policy 140 is obtained. In some embodiments, the script generation service 130 may be run programmatically and repeatedly, to continuously generate and/or update the data collection scripts 150 and assessment scripts 160, in response to changes in the security policy 140. Because service 130 allows these scripts 150 and 160 can be generated automatically and very quickly, the compliance monitoring process can be run continuously without any downtime, even when the security policy 140 changes from time to time.

In some embodiments, the script generation service 130 may be configured to generate scripts 150 and 160 for only a subset of the security policy 140. For example, the service 130 may be configured to accept user input that specifies which tests or rules to generate script(s). As another example, the service 130 may be configured to generate and maintain a mapping that maps each object or test in the security to a corresponding set of commands 152 or queries 162 generated by the service 130. When the security policy is updated or changed, the service 130 will check the mapping to determine a list of data objects or tests that are affected by the change, and then use that information to identify a subset of the scripts 150 and/or 160 that needs to be regenerated. In this way, the service 130 does not need to regenerate the entire set of scripts 150 and 160 for every small change to the security policy 140, which can be fairly long.

As shown, in some embodiments, the data collection scripts 150 will be generated as shell commands 152 to collect object states of relevant data objects. In some embodiments, the shell commands are executable in a shell environment that is native to machines 110 in the computer network 100 (e.g. POWERSHELL for WINDOWS machines), so that the scripts themselves do not include content that is specific to the data collection agents 120. In some embodiments, the agents 120 are controlled by the network monitoring service 170 through an agent control protocol, and the data collection scripts 150 and shell commands 152 are uploaded to the agents through the protocol as encrypted content. In some embodiments, the agents 120 or some other agent management entity in the client network 100 will cache the data collection scripts 150, so that the scripts only need to be re-uploaded 154 when they change.

As shown, in some embodiments, the assessment scripts 160 will include queries 162 that can be used to query the network configuration state database 180 to evaluate collected object states stored in the database. In some embodiments, the queries may be generated in a standard query language understood by the network configuration state database 180, for example SQL, so that the generated queries do not depend on the specific implementation of assessment components in the network monitoring service 170. In some embodiments, the queries may be generated to check a particular data item in the database 180 for a compliant state value specified by the security policy 140. The query may return a Boolean value (true or false) indicating whether the current state of the data item is compliant or non-compliant. In some embodiments, the query may use an object identifier of the data object indicated in the security policy to reference the relevant data item the database 180. In this way, the generated queries are not necessarily tied to the particular schema of the database 180 and do not need to be changed whenever the schema changes.

FIGS. 2A to 2C illustrate an example security policy 200 specified in a security policy specification language (SPSL) that is used to generate data collection scripts, according to some embodiments. As shown in FIG. 2A, the security policy is specified in an XML format in accordance with a defined XML schema, similar to OVAL.

As shown, in this example, the security policy 200 defines a compliance test 210. In general, a security policy 200 can define many compliance tests for many configuration settings of a machine. In this example, compliance test 210 indicates an object with a unique object ID and a compliant state of the object with a unique state ID.

As shown, the object ID references a data object 220 defined separately in the policy 200. In this example, object 220 is a specific registry entry in the WINDOWS registry. Object 220 has a number of object entities or attributes 222, which in this case is used to uniquely identify the registry entry on the WINDOWS machine. In some embodiments, the script generation service 130 will parse this data object definition 220 and generate one or more data collection commands 152 in a WINDOWS shell scripting language to obtain the state of this registry entry. For example, the commands 152 may be executed by an agent running on a particular WINDOWS machine. The results of the commands 152 may be written to a results file and returned to the network monitoring service 170.

As shown, the compliant state referred to by the compliance test 210 is defined as a separate object state 230 in the policy 200. In this example, the policy indicates that the compliant state of the registry key should be 1. In some embodiments, the compliant state definition 230 is parsed by the script generation service 130 to generate assessment queries 162. For example, the assessment query 162 may query the network configuration state database 180 to check whether the collected value for registry key equals 1.

As shown, FIG. 2B illustrates additional data from the security policy 200. In this example, another data object 240 is defined with a variable reference 242. In some embodiments, the SPSL (such as OVAL) allows for such variables to be used throughout the policy specification. Variables may be used in both data objects 210 and compliant states 220. In some embodiments, the script generation service 130 is able to parse these variable references 242 and resolve them 244 to the actual definition of the variable 250 in the policy 200. In this example, the variable 250 resolves to a string value that concatenates a list of registry keys, and script generation service 130 will determine this string value and embed this string in the generated data collection commands 152.

As shown, in this example, the variable definition 250 uses a transformation function 252 (here concatenate) to define the string value. In some embodiments, the SPSL may rely on a number of these data manipulation or transformation functions to define data objects or objects states. In some embodiments, the script generation service 130 will recognize these transformation functions 252 and apply these functions to resolve 254 object or state values when generating the data collection commands 152.

As shown, in this example, the variable 250 references another object 260, which is again defined separately in the policy 200. In this example, the referenced object 260 is a list of registry keys in a WINDOWS hive file that matches a particular match pattern. In at least some embodiments, the script generation service 130 will translate this match pattern to the approach syntax or match format used by the WINDOWS registry API in the data collection command 152 to the list of keys for the concatenate function 252.

As shown, FIG. 2C illustrates additional data from another security policy 270. In this example, which relates to a UNIX machine, data object 280 is defined with a filter 282. In some embodiments, the SPSL allows objects or states to be defined in terms of state filters so that the value of the objects or states are resolved 284 at collection time (e.g. when the scripts are executing), as opposed to when the scripts are generated. In this example, the file object will be resolved to any file that is owned by a user with user ID 755. As shown, the filter state 290 used by the filter is defined separately from the filter reference in the file object 280. In some embodiments, the script generation service 130 will recognize the user of these filter references and generate appropriate data collection commands 152 to obtain and apply the filter state 290 (e.g. commands to obtain a file listing that satisfies the filter state).

Figure 3:
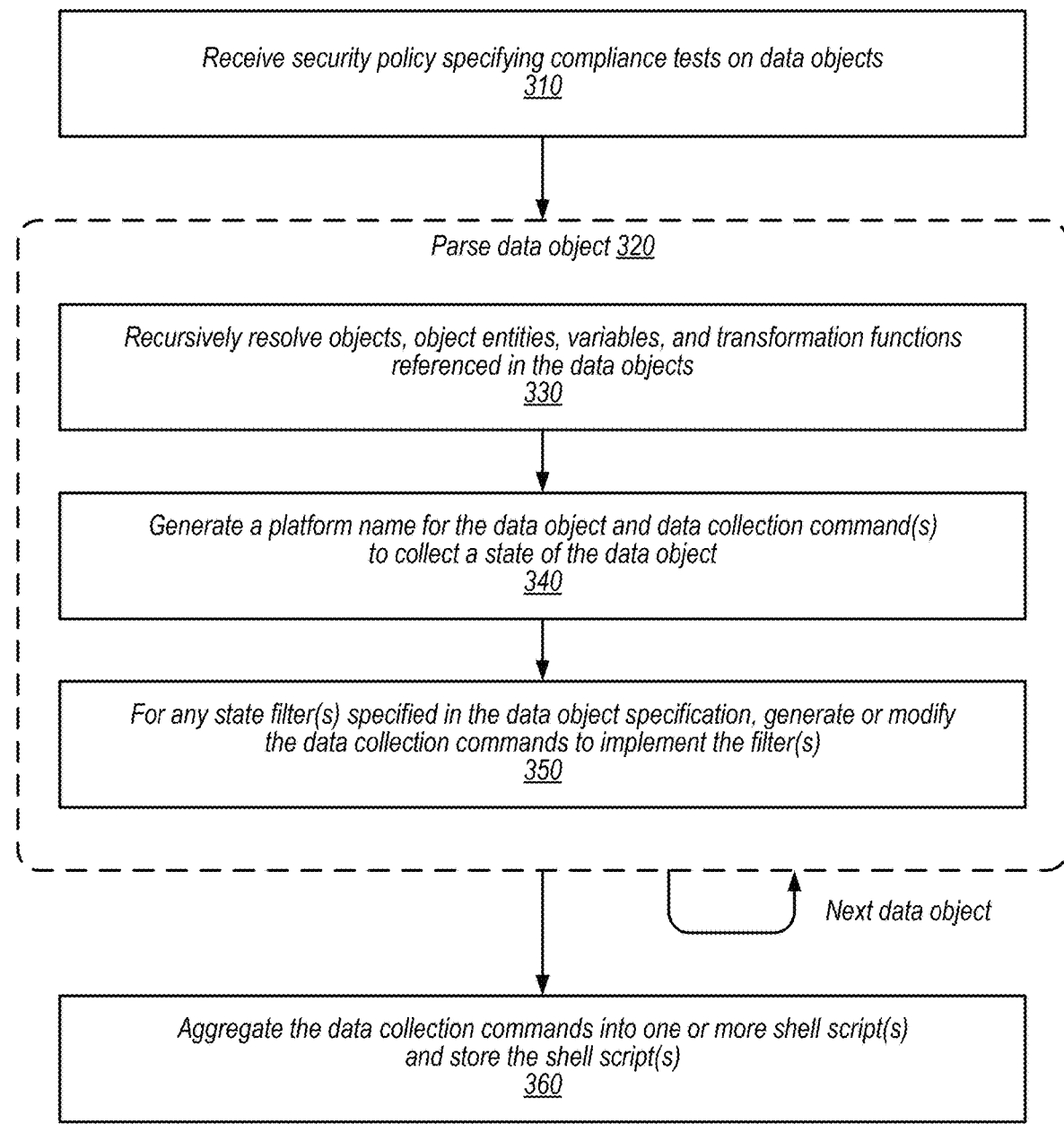
FIG. 3 is a flowchart illustrating a process performed by the script generation service to generate data collection scripts, according to some embodiments.

FIG. 3 is a flowchart illustrating a process performed by the script generation service 130 to generate data collection scripts, according to some embodiments.

The process begins at operation 310, where a security policy specifying compliance tests on data objects is received. In some embodiments, the security policy is security policy 140 of FIG. 1. The security policy may be a standard security benchmark issued by public organizations, or a private policy of a company. The security policy may specify tests 142 for checking the compliance status of a machine 110, based on the machine's configuration state. In some embodiments, the security policy may be specified in a SPSL that allows objects 220 and object states 230 to be specified based on references to object entities 222, variables 242, transformation functions 252, other objects 260, and state filters 282. In some embodiments, the SPSL is the OVAL definition language, which defines an XML schema for expressing security policy content.

As shown, operations 330, 340, and 350 are repeated for individual data objects in the security policy based on a parsing 320 of the data objects. In some embodiments, the parsing may be performed using a custom XML parser. At operation 330, the service 130 recursively resolves various types of references in the data object specification, including references to other objects, object entities, variables, and transformation functions, as discussed in connection with FIGS. 2A and 2B. The result of these resolutions is to generate 340 a platform-specific name or one or more platform-specific command(s) to collect the state of the data object on the machine. For example, the fully resolved data object name may identify a specific registry entry on a WINDOWS machine. At operation 350, if there are any references to state filter(s) that are specified in the data object specification, such as discussed in connection with FIG. 2C, those references are also resolved by generating or modifying 350 the data collection commands to implement the filter(s). As discussed, a state filter may be implemented by generating one or more platform-specific commands to include or exclude collected state information for one or more data objects. An example of a state filter may be a list of files on the machine that satisfy a collection-time criterion. Operation 320 may be repeated for all objects in the security policy or just a subset of the data objects, depending on the usage context and/or configuration or input parameter specified for the service 130.

At operation 360, the service 130 aggregates the data collection commands into one or more shell scripts that are executable on the machine, for example by an data collection agent 120 executing on the machine. For example, for a WINDOWS machine, the shell script may be a POWERSHELL script, and the commands may use one or more WINDOWS APIs to collect the object states. These scripts may include control flow statements that control how the commands are executed, such as if-else statements, control loops, definitions of shell functions, and the like. In some embodiments, the object states are written to a results file on the machine, which may be returned directly by the data collection agent or uploaded to the network monitoring service 170 through another mechanism. In some embodiments, the collected data may be indexed based on object IDs specified in the security policy, so that the collected data items can be easily identified later during an assessment process. In some embodiments, any errors encountered during the data collection process may also be written to the results file or to a separate log file.

Figure 4:
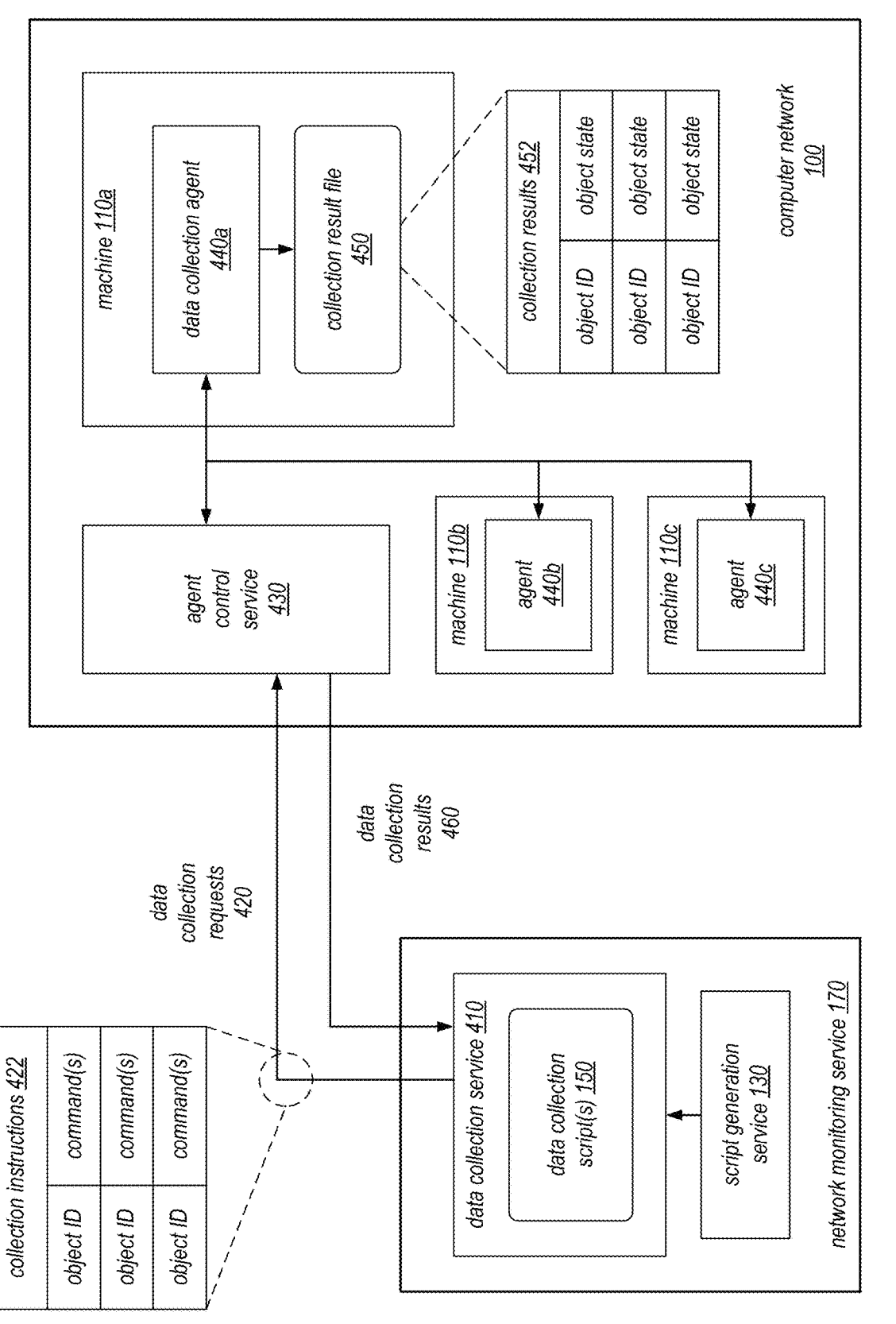
FIG. 4 illustrates functionality of a data collection service and data collection agent(s) deployed in a computer network to execute data collection scripts, according to some embodiments.

FIG. 4 illustrates functionality of a data collection service 410 and data collection agent(s) 440a-c deployed in a computer network 100 to execute data collection scripts 150, according to some embodiments.

As shown, in this example, the network monitoring service 170 includes a data collection service 410 that is tasked with pushing the data collection scripts 150 to the computer network 100. In this example, the script generation service 130 also executes as part of the network monitoring service 170 to occasionally generate the data collection scripts 150 for uploading.

As shown, in some embodiments, the agents 440a-c in the computer network 100 are controlled by a local agent control service 430. In some embodiments, the agent control service 430 is responsible for directly interfacing with the data collection service 410 and control the agents 440 to perform tasks accordingly. In some embodiments, the agents 440 execute directly on the machines 110 as authenticated processes so that data collection tasks can be performed on the machines without further authentication.

In some embodiments, the data collection service 410 will send the data collection commands to the agent control service 430 as collection instructions 422 specifies along with data collection requests 420. The data collection requests 420 may be specified through a proprietary communication protocol between the network monitoring service 170 and the agent control service 430, which provides a secure mechanism for the network monitoring service 170 to specify platform-specific commands to run on individual machines 110 and receive information about the machines. In some embodiments, the data collection commands sent to the agent control service may be indexed according to object IDs indicated in the security policy, so that these object IDs can later be used to evaluate the collected state data. In some embodiments, the agent control service 430 may cache these data collection commands or scripts, so that the network monitoring service does not need upload the commands repeatedly.

Once the data collection commands 150 are received by the agent control service 430, the agent control service 430 may instruct individual ones of the data collection agents 440 to run the commands/scripts. As discussed, in some embodiments, the data collection commands/scripts will create one or more collection result files 450 on the machine 110. These files 450 may indicate collection results 452, which may index the results according to the object IDs. In some embodiments, the collection results 452 may also indicate other metadata such as the time of collection and any error encountered during the collection. The collection result files may be returned by the agents 440 to the agent control service 430, or in some embodiments, the agent controls service may retrieve these files 450 from the machines 110a-c by logging onto the machines.

In some embodiments the agent control service 430 will send the collected result files 450 as data collection results 460 back to the data collection service 410. The results 460 may be transmitted according to the proprietary communication protocol between the network monitoring service 170 and the agent control service 430, as discussed earlier. In some embodiments, the results 460 may be transmitted to the network monitoring service by the agents 440 themselves.

In some embodiments, in the described manner, the network monitoring service 170 may perform a data collection from the computer network 100 to collect configuration states for all machines or assets in the computer network. The data collection process may involve multiple rounds of data collection requests 420 to gather more and more specific information about the machines 110. In some embodiments, the data collection process may be performed regularly on a set schedule, and the results 460 are used to perform regular assessments for compliance with the security policy 140.

Figure 5:
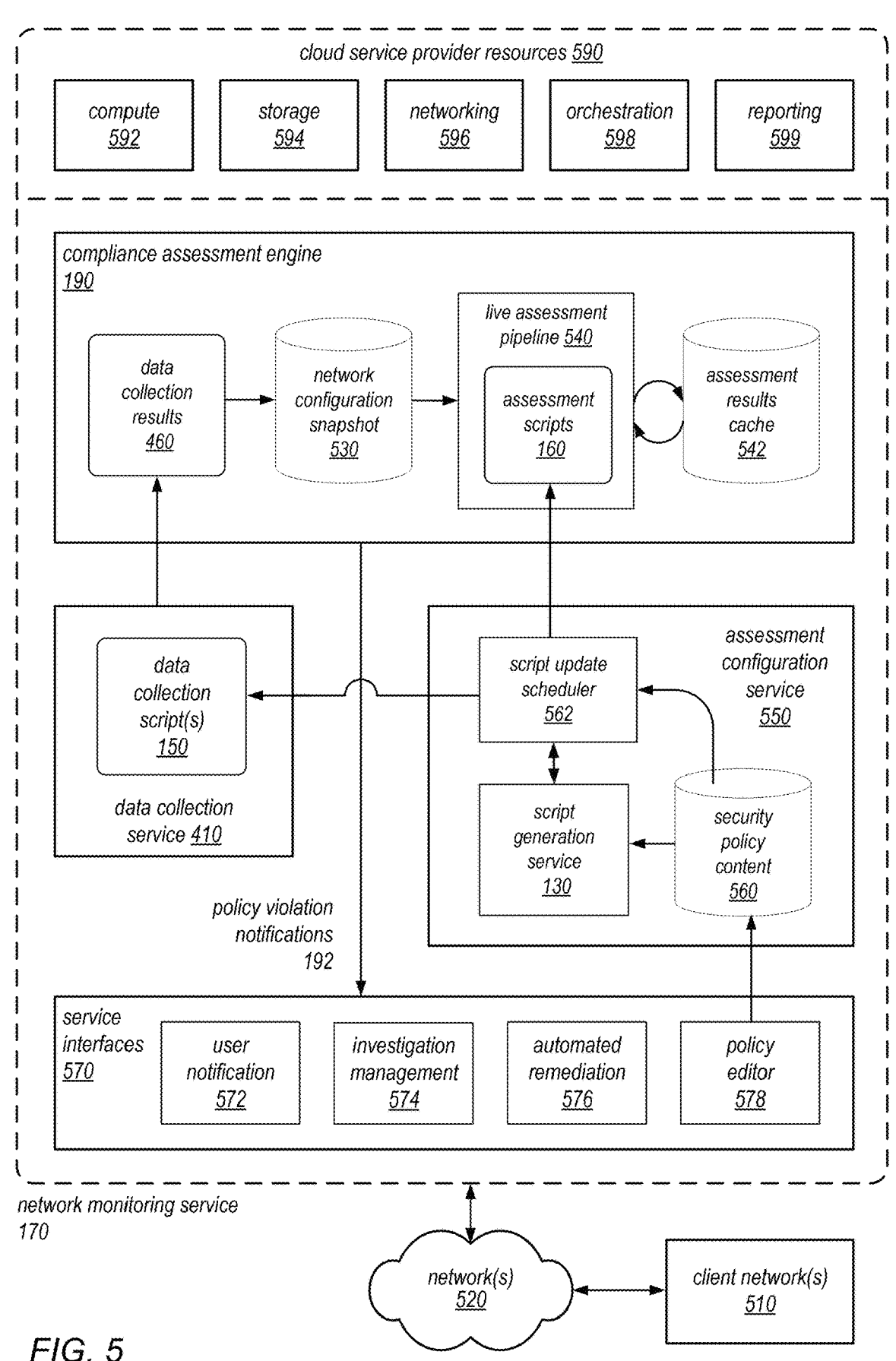
FIG. 5 illustrates an example network monitoring service that implements security policy compliance assessment of client computer network(s), using resources of a cloud service provider network, according to some embodiments.

FIG. 5 illustrates an example network monitoring service 170 that implements security policy compliance assessment of client computer network(s) 510, using resources 590 of a cloud service provider network, according to some embodiments.

As shown in the figure, embodiments of the network monitoring service 170 may be implemented using resources 590 provided by a cloud service provider. The cloud service provider may be a software-as-a-service (SaaS) provider, a platform-as-a-service (PaaS) provider, or an infrastructure-as-a-service (IaaS) provider. Examples of cloud service providers include AMAZON WEB SERVICES (AWS), MICROSOFT AZURE, GOOGLE CLOUD, and the like. In this example, an instance of the network monitoring service 170 is implemented as a cloud-based service that is actively monitoring security compliance for many client networks 510. In some embodiments, a client network 510 may itself be a virtual private network hosted in the cloud service provider environment. In some embodiments, the client network(s) 510 are examples of computer network 100 of FIG. 1.

As shown, in this example, the cloud service provider network may provide different types of compute 592, storage 594, networking 596, orchestration 598, and reporting 599 resources for building cloud-hosted applications. The cloud service provider network may also provide other types of infrastructure services not shown here. Aspects of the network monitoring service 170 may be built on top of the infrastructure provided by these resource services. For example, computing resources used to implement the script generation service 130 may include virtual machines provided by the cloud service provider, which are instances of an emulated computer or execution environment that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtual machine is the container, which provides a portable and isolated execution environment over a host operating system of a physical host. Example implementations of container technologies include DOCKER, GOOGLE KUBERNETES, AMAZON WEB SERVICES, and MICROSOFT AZURE.

As shown, in some embodiments, the network monitoring service 170 implements the data collection service 410, the compliance assessment engine 190, and an assessment configuration service 550. The data collection service 410 may operate as discussed in connection with FIG. 4 to push data collection scripts 150 to data collection agents in the client networks 510 and receive data collection results 460 from the agents.

In some embodiments, the data collection results 460 are provided to the compliance assessment engine 190, which may use the data collection results to create a network configuration snapshot 530 of the client network 510. In some embodiments, this snapshot 530 is created in the network configuration state database 180 of FIG. 1, which may be used to store a historical series of these snapshots. In some embodiments, the compliance assessment engine 190 then executes a live assessment pipeline 540 to evaluate the network configuration snapshot 530 for compliance status of the client network 510. As discussed, in some embodiments, the assessment is performed using a number of queries against the collected network configuration data, which may be part of the assessment scripts 160 generated by the script generation service 130. In some embodiments, different assessment scripts 160 are used for different types of machines. For example, the pipeline 540 may use a first set of assessment scripts for WINDOWS machines, a second set of assessment scripts for LINUX machines, a third set of assessment scripts for MACOS machines, etc. In some embodiments, the assessments may be triggered in real time or near-real time, as soon as the data collection results 460 are received or the network configuration snapshot 530 is created.

In some embodiments, compliance assessment results generated by the live assessment pipeline 540 are written to an assessment results cache 542. This cache 542 may be indexed by object or test IDs indicating the compliance status for different portions of the security policy. In some embodiments, the cached results 542 may indicate which particular assets are currently in violation of the security policy, and a list of the failed compliance tests for each asset. In some embodiments, a violation of any portion of the security policy will trigger a policy violation notification 192. In some embodiments, a violation of a security policy test is only reported if it is a new violation on a particular asset. If a violation is ongoing (e.g. has persisted for multiple assessment cycles), the assessment engine 190 may refrain from reporting the violation (or report the violation as a low-priority violation for alert triage purposes).

In some embodiments, the assessment configuration service 550 is responsible for the configuration of both the data collection service 410 and the compliance assessment engine 190. As shown, part of the duties of the assessment configuration service 550 is to update the data collection service 410 and the compliance assessment engine 190 with new data collection scripts 150 and assessment scripts 160 when the security policy content 560 changes. As shown, in some embodiments, a security policy 140 may be stored in the security policy content repository 560, and may be edited via a policy editor interface 578. Such a policy editor interface may be a GUI-based editor that can be used to change or customize the security policies of a company. In some embodiments, when a change has been made to a security policy content 560, the script generation service 130 is invoked to generate updated data collection scripts 150 and assessment scripts 160 from the changed security policy content. These scripts 150 and 160 are then provided to a script update scheduler 562, which is tasked with pushing the updated scripts to other components of the assessment pipeline. In some embodiments, the data collection service 410 may be configured to perform its own scheduling of the push, so that the new data collection scripts 150 will take effect prior to a next scheduled data collection from the client network 510. In some embodiments, the script update scheduler 562 may decide where to make the script update push based on the type of security policy content change. For example, if a security policy content change only affects LINUX machines, the scheduler 562 may only schedule script updates for agents on LINUX machines in the client network 510 and only update the LINUX portion of the live assessment pipeline 540.

In some embodiments, the service interfaces 570 may be accessible from client networks 510 to enable, disable, execute, or otherwise configure various features of the network monitoring service 170. In some embodiments, portions of the service interfaces 570 may be accessible from a security operations center (SOC) where security analysts are monitoring computer networks of multiple different locations, data centers, and/or companies. In some embodiments, the service interfaces 570 may include web-based graphical interfaces to provide user notification 572, security issue investigation management 574, and automated remediation 576, and security policy editing 578. The user notification interface 572 may be configured to display policy violation notifications 192 generated by the compliance assessment engine 190. The user notification interface 572 may be a real-time alert interface. The investigation management interface 574 may implement various controls to allow analysts to investigate security alerts generated by the network monitoring service 170, for example, to open and close tickets for investigations, to review network event logs, and to log on to the client network 510 to perform direct evaluations of the network. The automated remediation interface 576 may be implemented as an API that can be used to invoke automated remediation actions in response to a detected security policy violation. As discussed, the policy editor interface 578 may be used to make changes to security policies of the client networks 510.

In various embodiments, the network(s) 520 that connects the network monitoring service 170 and the client networks 510 may encompass any suitable combination of networking hardware and protocols necessary to establish communications between the client(s) 510 and the network monitoring service 170. In some embodiments, client(s) 510 may execute in a private network of a company, behind a company firewall, and the network 520 may include a public network such as the Internet, which lies outside the firewall. The network 520 may encompass the different telecommunications networks and service providers that collectively implement the Internet. In some embodiments, the network 520 may also include private networks such as private local area networks (LANs), private wide area networks (WANs), or private wireless networks. The network 520 may be implemented using different hardware (e.g., modems, routers, switches, load balancers, proxy servers, etc.) and software (e.g., protocol stacks, accounting software, firewall/security software, etc.) for establishing networking links between client(s) 510 and the network monitoring service 170.

FIG. 6 is a flowchart illustrating a process of generating and uploading scripts to implement security policy compliance assessment of computer network(s), according to some embodiments.

The process begins at operation 610, where the system receives a security policy 140 specified in a security policy specification language. In some embodiments, the security policy is a standard security benchmark for a type of machine (e.g. WINDOWS machines), promulgated by a public security organization. In some embodiments, the security policy specifies a list of tests for various configuration aspects of the machine to evaluate compliance of the machine with respect to the security policy. In some embodiments, each test in the policy may specify one or more data objects to be checked and one or more compliant states of the one or more data objects.

At operation 620, the security policy is parsed to identify the tests, data objects, and compliant states specified in the policy. In some embodiments, operation 620 is performed by the script generation service 130 of FIG. 1. As discussed in connection with FIG. 3, the parsing may involve recognizing and resolving various policy specification language elements of the SPSL, including nested objects, variables, object entities/attributes, transformation functions, and/or state filters, etc. The results of this parsing may be encoded as a parse tree (e.g. a DOM tree for XML documents) and used to generate data collection and/or assessment commands.

At operation 630, the script generation service 130 generates data collection commands for the data objects identified in the security policy. In some embodiments, the generated commands are shell commands 152 executable in a shell execution environment associated with the machine. In some embodiments, the commands are generated as part of a shell script 150 that uses control flow features of a shell scripting language. In some embodiments, the generated commands use one or more native APIs of an operating system of the machine to collect states of the data objects from the machine.

At operation 640, the shell scripts are sent to a computer network, to be executed by data collection agents executing on machines in the computer network. In some embodiments, these data collection agents execute on the machines as authenticated processes, and can execute any commands on the machines under administrator privileges. In some embodiments, the data collection scripts 150 are pushed by the network monitoring service to the agents over a wide area such as the Internet, using a proprietary communication protocol implemented by the network monitoring service to the agents.

At operation 650, the script generation service 130 generates compliance check commands for the data objects identified in the security policy. In some embodiments, the generated commands are queries 162 or assessment scripts 160 executable to query a network configuration state database 180 and evaluate the configuration state of the computer network for compliance with the security policy. In some embodiments, the network configuration state database is regularly populated with data collected by the data collection agents, and the queries and/or assessment scripts are executed regularly to continuously monitor the computer network's compliance with the security policy.

At operation 660, the generated queries and/or assessment scripts are sent to the network monitoring service 170, which may implement a policy compliance assessment engine 190 to check the network configuration state data for security policy violations. In some embodiments, the queries and/or shell scripts may return a true or false result for each data object in the security policy based on the network configuration state data, which indicates a compliance finding for each data object. As shown, the operations of the process of FIG. 6 may be repeated for subsequent updates to the security policy, to automatically push new scripts generated as a result of these updates. For example, the system may detect a change to the security policy or that a new version of the security policy has been received, and automatically generate and push new data collection and assessment scripts to their respective destinations.

Figure 7:
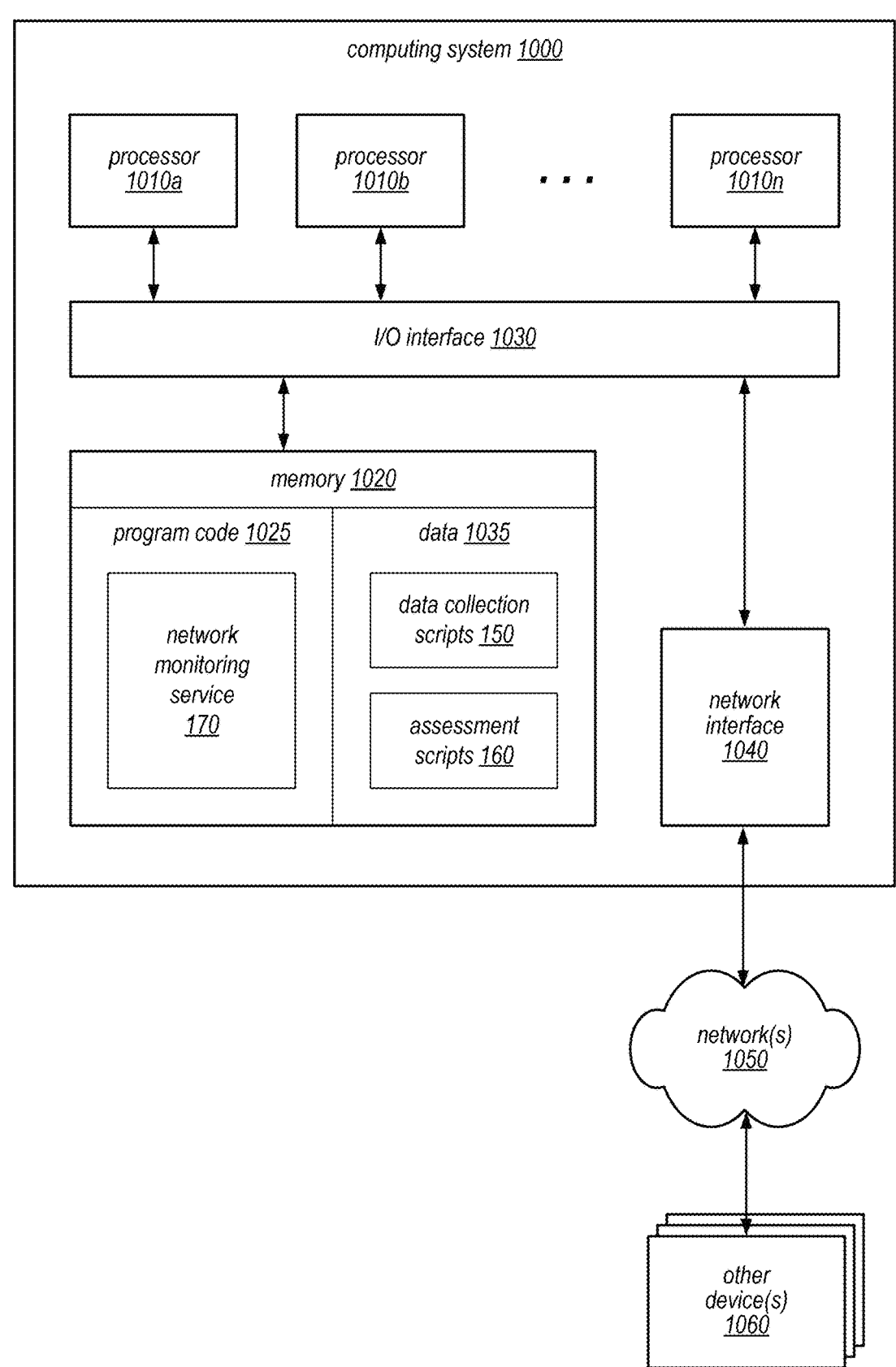
FIG. 7 is a block diagram illustrating an example computer system that can be used to implement one or more portions of a network monitoring service that generates data collection and assessment scripts from a security policy, according to some embodiments.

FIG. 7 is a block diagram illustrating an example computer system that can be used to implement one or more portions of a network monitoring service 170 that generates data collection and assessment scripts from a security policy 140, according to some embodiments.

Computer system 1000 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1000 includes one or more processors 1010, which may include multiple cores coupled to a system memory 1020 via an input/output (I/O) interface 1030. Computer system 1000 further includes a network interface 1040 coupled to I/O interface 1030. In some embodiments, computer system 1000 may be a uniprocessor system including one processor 1010, or a multiprocessor system including several processors 1010*a-n*, as shown. The processors 1010 may be any suitable processors capable of executing instructions. For example, in various embodiments, processors 1010 may implement one of a number of instruction set architectures (ISAs), such as the x86, PowerPC, SPARC, or MIPS ISA.

As shown, the computer system 1000 may also include one or more network communication devices (e.g., network interface 1040) for communicating with other systems and/or components over a communications network. For example, an instance of an application executing on computer system 1000 may use network interface 1040 to communicate with another server application executing on another computer system, as described herein.

As shown, computer system 1000 may use its network interface 1040 to communicate with one or more other devices 1060, such as persistent storage devices and/or one or more I/O devices. In some embodiments, some of these other devices may be implemented locally on the computer system 1000, accessible via the I/O interface 1030. In various embodiments, persistent storage devices may include disk drives, tape drives, solid state memory, other mass storage devices, or any other persistent storage device. The computer system 1000 may store instructions and/or data in persistent storage devices, and retrieve the stored instruction and/or data as needed.

As shown, the computer system 1000 may include one or more system memories 1020 that store instructions and data accessible by processor(s) 1010. In various embodiments, system memories 1020 may be implemented using any suitable memory technology, (e.g., one or more of cache, static random-access memory (SRAM), DRAM, RDRAM, EDO RAM, DDR 10 RAM, synchronous dynamic RAM (SDRAM), EEPROM, non-volatile/Flash-type memory, etc.). The system memory 1020 may be used to store code 1025 or executable instructions to implement the methods and techniques described herein. For example, the executable instructions may include instructions to implement the functionality of the network monitoring service 170, as discussed. The system memory 1020 may also be used to store data 1026 needed or produced by the executable instructions. For example, the in-memory data 1026 may include the data collection scripts 150 and the assessment scripts 160, as discussed.

In some embodiments, some of the code 1025 or executable instructions may be persistently stored on the computer system 1000 and may have been loaded from external storage media. The persistent storage of the computer system 1000 and the external media are examples of non-transitory computer-readable storage media, which may be used to store program instructions to be executed by the computer system 1000. A non-transitory computer-readable storage medium may provide the capability to store information in a form readable by a machine (e.g., computer system 1000). Non-transitory computer-readable media may include storage media such as magnetic or optical media, disk or DVD/CD-ROM devices, archival tapes, network-attached storage systems, or other computer systems.

In some embodiments, the I/O interface 1030 may be configured to coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect

15

(PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

In some embodiments, the network interface 1040 may allow data to be exchanged between computer system 1000 and other devices attached to a network. The network interface 1040 may also allow communication between computer system 1000 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1000. Multiple input/output devices may be present in computer system 1000 or may be distributed on various nodes of a distributed system that includes computer system 1000. In some embodiments, similar input/output devices may be separate from computer system 1000 and may interact with one or more nodes of a distributed system that includes computer system 1000 through a wired or wireless connection, such as over network interface 1050. Network interface 1040 may commonly support one or more wireless networking protocols (e.g., Wi-Fi/IEEE 802.11, or another wireless networking standard). In some embodiments, the network interface 1040 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system, comprising:
one or more computing devices configured to implement a script generation service, configured to:
receive a security policy specified in a security policy specification language (SPSL);
parse the security policy to identify a plurality of tests to check compliance of a machine, wherein individual ones of the tests specify (a) one or more data objects to be checked and (b) one or more compliant states of the one or more data objects;
generate data collection commands for data objects identified in the security policy, wherein the data collection commands are generated as one or more shell scripts executable on the machine to collect respective states of the data objects; and
send, over one or more networks, the one or more shell scripts generated from the security policy to a computer network, wherein the computer network includes a plurality of machines that execute agents configured to collect machine state data of the machines using the one or more shell scripts.

2. The system of claim 1, wherein:
the security policy specifies a data object that includes a variable; and

the script generation service resolves the variable to generate one or more data collection commands for the data object.

3. The system of claim 1, wherein:
the security policy specifies a data object that includes a reference to another data object; and
the script generation service resolves the reference to the other data object to generate one or more data collection commands for the data object.

4. The system of claim 1, wherein:
the security policy specifies a data object using one or more transformation functions defined by the SPSL; and
the script generation service generates one or more data collection commands for the data object based on the one or more transformation functions.

5. The system of claim 1, wherein:
the security policy specifies a data object using one or more state filters on a state of the data object; and
the script generation service generates one or more data collection commands for the data object to implement the one or more filters.

6. The system of claim 1, wherein the security policy is a public benchmark published by a security standard-setting organization.

7. The system of claim 1, wherein the script generation service is configured to generate shell scripts in different shell scripting languages.

8. The system of claim 1, wherein:
the script generation service executes as part of a network monitoring service configured to monitor compliance of a plurality of client networks;
the computer network is a client network monitored by the network monitoring service; and
the network monitoring service is configured to, periodically:
collect the machine state data from the computer network via the data collection agents;
assess the machine state data for compliance with the security policy; and
generate a notification when a violation of the security policy is detected.

9. The system of claim 8, wherein:
the network monitoring service is implemented using resources of an infrastructure provider network; and
the generation of the one or more data collection scripts are performed by one or more virtual compute instances provisioned on the infrastructure provider network.

10. The system of claim 8, wherein:
the data collection agents execute as authenticated processes in the computer network; and
the network monitoring service is configured to collect the machine state data without supplying authentication credentials for the computer network.

11. A method, comprising:
executing a script generation service implemented using one or more computing devices, including:
receiving a security policy specified in a security policy specification language (SPSL);
parsing the security policy to identify a plurality of tests to check compliance of a machine, wherein individual ones of the tests specify (a) one or more data objects to be checked and (b) one or more compliant states of the one or more data objects;
generating data collection commands for data objects identified in the security policy, wherein the data collection commands are generated as one or more shell scripts executable on the machine to collect respective states of the data objects; and sending, over one or more networks, the one or more shell scripts generated from the security policy to a computer network, wherein the computer network includes a plurality of machines that execute agents configured to collect machine state data of the machines using the one or more shell scripts.

12. The method of claim 11, wherein the security policy is a public benchmark published by a security standard-setting organization.

13. The method of claim 11, wherein:

the security policy specifies a data object using one or more references to one or more object entities, variables, other objects, transformation functions, or state filters in accordance with a schema specified by the SPSL; and the script generation service resolves the one or more references to generate one or more data collection commands for the data object.

14. The method of claim 11, wherein:

the script generation service executes as part of a network monitoring service configured to monitor compliance of a plurality of client networks;

the computer network is a client network monitored by the network monitoring service; and the method comprises the network monitoring service periodically:

collecting the machine state data from the computer network via the data collection agents;

assessing the machine state data for compliance with the security policy; and generating a notification when a violation of the security policy is detected.

15. The method of claim 14, further comprising:

using the machine state data to update a configuration snapshot of the computer network stored in a database; and assessing the machine state data for violations includes issuing queries to the configuration snapshot.

16. The method of claim 15, wherein the queries used to assess the machine state data are generated based on the parsing of the security policy.

17. The method of claim 14, further comprising:

comparing current assessment results of the computer network for a current assessment period to previous assessment results of the computer network for a previous assessment period stored in a results cache; and generating an alert in response to one or more changes in the current assessment results detected based on the comparison.

18. The method of claim 11, further comprising:

storing a mapping of individual data objects in the security policy and respective data collection commands generated for the individual data objects;

determining that an update to the security policy has occurred;

determining a list of data object that are affected by the update; and regenerating the subset of the data collection commands based on the list and the mapping.

19. The method of claim 18, further comprising:

selecting a scheduled time to regenerate the subset of the data collection commands, wherein the schedule time is before a next data collection time of the computer network; and causing the script generation service to regenerate the subset of the data collection commands at the scheduled time.

20. The method of claim 18, wherein the update to the security policy is received via a graphical user interface.

* * * * *